Dec. 8, 1959   J. BAXTER   2,915,829
BRICK COURSE LEVEL AND HEIGHT GAUGE
Filed Sept. 14, 1956

INVENTOR.
JOHN BAXTER
BY
McMorrow, Berman & Davidson
ATTORNEYS

United States Patent Office 2,915,829
Patented Dec. 8, 1959

2,915,829

BRICK COURSE LEVEL AND HEIGHT GAUGE

John Baxter, Canton, Ohio

Application September 14, 1956, Serial No. 609,834

1 Claim. (Cl. 33—88)

This invention relates to an improved brick course level and height gauge.

In the process of building a masonry wall of a plurality of superimposed bricks or blocks, a story-pole is commonly used to check the height of courses above a bench mark on the building and to establish key bricks, as at the corner of a course, and to employ a mason's level for checking the level of the courses, as the process proceeds, and the provision, maintenance, and use of these separate implements involves substantial work, expense, and waste of working time.

A primary object of the invention is to provide a simple, efficient, and adjustable combined course gauge and level of the character indicated which eliminates the necessity for providing and using a story-pole and a mason's level in laying brick courses.

This together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1:
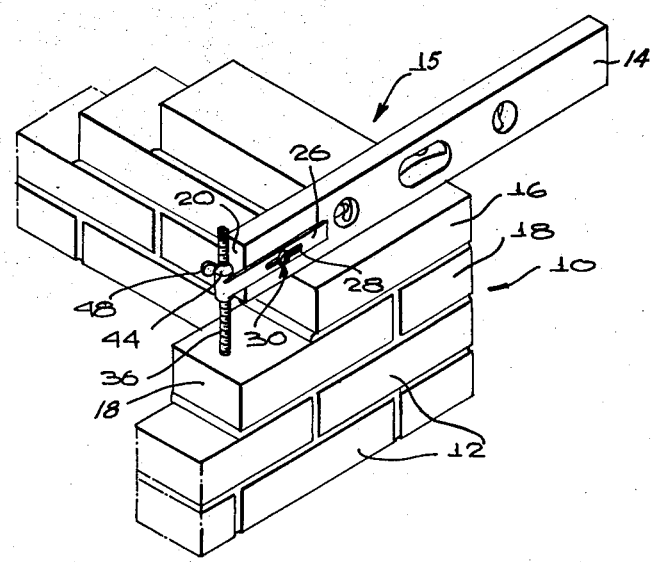
Figure 1 is a perspective view showing a wall constructed of courses of masonry blocks, showing the device of the invention applied thereto.

Referring to the drawings in detail, there is shown a brick wall corner, indicated generally at 10, comprising a plurality of superimposed courses 12 of bricks 18, and a corner brick 16 imposed thereon, preliminary to completion of a wall extending from the corner 10.

The illustrated device, generally designated 15, comprises a conventional mason's level 14, in the form of a straight bar 17 having a squared free end 20, and parallel upper and lower edges 21 and 23, respectively.

The device 15 further comprises a height gauge assembly 22, which comprises an elongated flat bar 26 having therein near its rearward end a longitudinal closed slot 28 through which extends a clamping bolt 30 which extends also through a transverse bore 24 which is provided centrally in the level bar 17 in spaced relation to the end 20 thereof. The bolt 30 has an enlarged head 31 on one end which bears against the outer side of the bar 24, and a nut 33 and a washer 35 on the other end of the bolt 30 bears against the side of the level bar 17 remote from the gauge assembly bar 26. The clamping bolt 30 carried by the level bar 17 and extending slidably through the closed slot 28 in the flat bar 26 constitutes means connecting the bar 26 to the level bar 17 for longitudinal sliding movement of the bar relative to the level bar 17 and the nut 33 in threaded engagement with the bolt 30 and the washer 35 circumposed about said bolt constitutes means releasably securing the straight bar to the level bar in any position of its longitudinal movement.

Fixedly secured on the outer end of the gauge assembly bar 26 and located at the laterally inward side thereof, is a vertical sleeve 32 having a threaded bore 34. Threaded through the bore 34 is a vertically elongated threaded rod 36 having a lower end 38 and a slotted upper end 40, located below and above the sleeve 32, respectively.

Threaded on the rod 36 above sleeve 32 is a locking nut 44 which is adapted to be engaged with the upper end 46 of the sleeve 32 to hold an adjustment of the rod 36 in the sleeve 32. The nut 44 has an integral radially extending lever or handle 48 facilitating rotation thereof and tightening of the same on the upper end of the sleeve 32.

Figure 2:
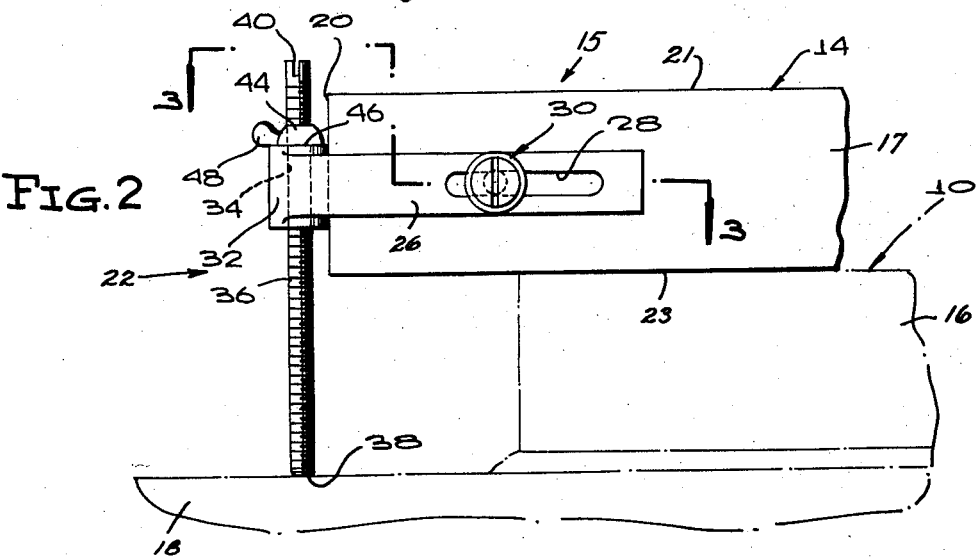
Figure 2 is an enlarged fragmentary side elevational view of the device shown applied to vertically adjacent courses, shown in phantom lines; and, Figure 3 is a fragmentary horizontal sectional view taken substantially on line 3—3 of Figure 2.
Figure 3:
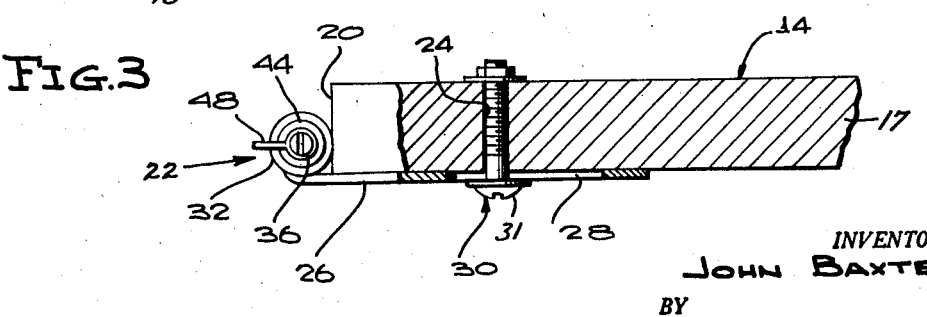

The device 15 is used in conjunction with the wall structure shown in Figure 1, by laying the level bar 17 with its lower edge 23 upon the corner brick 16, with the outer end 20 of the bar 17 extending beyond the brick 16 and spacedly overlying a brick 18 of the next lower course 12. The rod 36, if not already adjusted, is then adjusted in and locked in the sleeve 32, so that its lower end 38 bears upon the brick 18, the gauge assembly bar 26 having been adjusted longitudinally and, if necessary vertically, relative to the level bar 17 by loosening the bolt 30 and tightening the bolt 30. As shown in Figures 2 and 3, the gauge assembly bar 26 can be adjusted to place the sleeve 32 in abutment with the outer end 20 of the level bar 17, in which case the rod 36 is held at right angles to the length of the level bar 17. These adjustments having been made, the device 15 can then be used to check simultaneously the level and the height of bricks subsequently laid in a course with the brick 16.

The foregoing is considered as illustrative only of the principles of the invention. Further, since numerous modifications and changes will readily occur to those skilled in the art, it is not intended to limit the invention to the exact construction and operation shown and described, and accordingly all suitable modifications and equivalents may be resorted to, as fall within the scope of the appended claim.

What is claimed as new is as follows:

A combined brick course level and height gauge comprising an elongated level bar having a squared free end and a straight lower edge, a longitudinally elongated straight bar extending along and engaged with a side of the level bar above said lower edge, said straight bar having an inward end and an outer end reaching beyond said squared end of the level bar, means securing said straight bar to said level bar, a vertical sleeve fixed on the outer end of the straight bar and having a threaded bore therethrough, a threaded height gauge rod threaded through said bore, said rod having a free lower end below said sleeve and an upper end above said sleeve, said upper end of the rod having rod rotating means thereon, and a locking nut threaded on said rod above the sleeve and adapted to be turned down on the rod to engage the sleeve, said securing means comprising a bolt traversing said straight bar and said level bar, said straight bar having thereon a longitudinal slot through which said bolt extends, said sleeve being positioned at the same side of the straight bar as said level bar and being engaged with the squared outer end of the level bar.

References Cited in the file of this patent

UNITED STATES PATENTS

| 423,484 | Martin | Mar. 18, 1890 |
| 478,309 | Burchinal | July 5, 1892 |
| 1,016,254 | Dodds | Feb. 6, 1912 |
| 1,210,339 | Maddox | Dec. 26, 1916 |
| 2,175,655 | Allen | Oct. 10, 1939 |